March 13, 1928.

J. SCHWAN 1,662,540

GASOLINE GAUGE

Filed June 2, 1925

J. Schwan

Inventor

By C.A.Snow&Co.

Attorneys

Patented Mar. 13, 1928.

1,662,540

UNITED STATES PATENT OFFICE.

JOSEPH SCHWAN, OF MILWAUKEE, WISCONSIN.

GASOLINE GAUGE.

Application filed June 2, 1926. Serial No. 113,245.

This invention aims to provide novel means whereby the amount of gasoline in a tank on an automobile can be ascertained at a glance from a dial on the instrument board or elsewhere.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1:
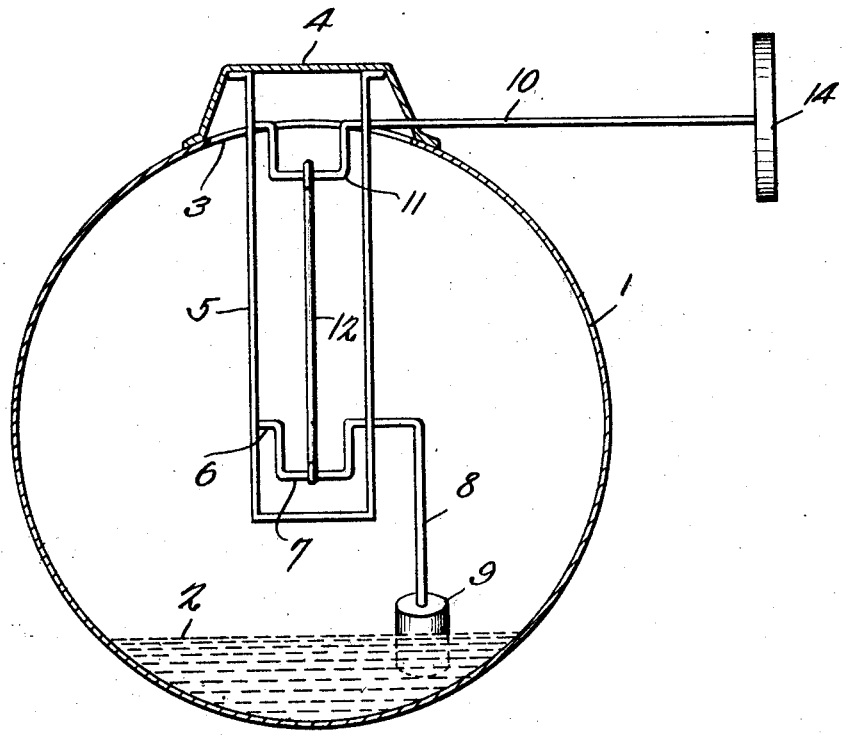
Figure 1 shows in elevation, a device constructed in accordance with the invention, parts being in section.
Figure 2:
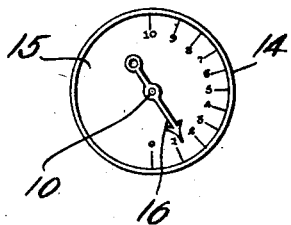
Figure 2 is an elevation showing the dial.

The numeral 1 indicates a tank, adapted to be placed anywhere on an automobile and containing gasoline or other fuel, shown at 2. In its top, the tank 1 has an opening 3. A support 4, in the form of a cap, is secured at its periphery to the tank 1, about the opening 3. The support or cap 4 carries a depending U-shaped bearing frame 5 which extends downwardly into the tank 1 through the opening 3. In the frame 5 is journaled a lower shaft 6 provided with a crank 7 located between the side portions of the frame 5. The shaft 6 is supplied at one end with an arm 8 located to one side of the frame 5, and supplied at its lower end with a float 9. An upper shaft 10 is mounted to rock in the frame 5 and in the cap 4. The upper shaft 10 has a crank 11 located between the side portions of the frame 5. The cranks 7 and 11 are connected by a pitman 12, the ends of which are pivoted on the cranks. On the dashboard of the vehicle, or elsewhere, is located a casing 14 carrying a dial 15. The shaft 10 is of any desired length and is journaled in the casing 14. A hand 16 on the shaft 10 cooperates with the dial 15. The dial 15 may be marked in any desired way.

As the level of the liquid in the tank 1 falls, the float 9 moves downwardly, the arm 8 rocking the shaft 6, and the crank 7, together with the pitman 12 rotating the shaft 10 by means of the crank 11, the hand 16, thus, being made to move over the dial 15, thereby to indicate to the occupant of the vehicle, the stage at which the fuel 2 stands in the tank 1.

A glance at Figure 1 of the drawings will show that all parts of the device are mounted on the support or cap 4, so that when the cap is mounted on the tank 1, all parts of the device are in place. Likewise, by removing the support or cap 4, all portions of the mechanism may be taken off the tank in one piece.

What is claimed is:—

In a device of the class described, a tank having an opening, a closure for the opening and mounted on the tank, a depending U-shaped bearing frame extended downwardly into the tank through the opening and carried by the closure, a lower shaft journaled in the side portions of the frame and provided with a crank located between the side portions of the frame, the shaft having an arm disposed externally of the frame, a float mounted directly on the arm and responsive to changes of liquid level in the tank, an upper shaft journaled in the side portions of the frame and in the closure and provided with a crank operating through the opening and located between the side portions of the frame, a pitman having its extreme ends mounted upon the cranks, and an indicating hand mounted directly upon the upper shaft.

In testimony that I claim the foregoing as my own, I have hereto affixed my signature.

JOSEPH SCHWAN.